(12) United States Patent
Takahashi et al.

(10) Patent No.: US 7,602,602 B2
(45) Date of Patent: Oct. 13, 2009

(54) CONDUCTIVE POLYMER AND SOLID ELECTROLYTIC CAPACITOR USING THE SAME

(75) Inventors: Naoki Takahashi, Sendai (JP); Ryuta Kobayakawa, Sendai (JP); Tomoki Nobuta, Sendai (JP); Yasuhisa Sugawara, Sendai (JP); Satoshi Suzuki, Sendai (JP)

(73) Assignee: Nec Tokin Corporation, Sendai-shi, Miyagi (JP)

( * ) Notice: Subject to any disclaimer, the term of this patent is extended or adjusted under 35 U.S.C. 154(b) by 0 days.

(21) Appl. No.: 12/360,238

(22) Filed: Jan. 27, 2009

(65) Prior Publication Data

US 2009/0225499 A1 Sep. 10, 2009

(30) Foreign Application Priority Data

Mar. 4, 2008 (JP) .............................. 2008-053391

(51) Int. Cl.
*H01G 9/00* (2006.01)
(52) U.S. Cl. ..................... 361/523; 361/525; 361/528; 361/529; 361/516; 361/519; 29/25.01; 29/25.03
(58) Field of Classification Search ................. 361/523, 361/525, 528–529, 516–519, 532; 29/25.01, 29/25.03

See application file for complete search history.

(56) References Cited

U.S. PATENT DOCUMENTS

| | | | |
|---|---|---|---|
| 4,737,557 A | 4/1988 | Sato et al. | |
| 5,279,768 A | 1/1994 | Destryker et al. | |
| 6,154,358 A * | 11/2000 | Fukaumi et al. | ............. 361/523 |
| 6,212,064 B1 * | 4/2001 | Aoki et al. | ................... 361/523 |
| 6,215,651 B1 * | 4/2001 | Takada et al. | ............... 361/523 |
| 6,361,572 B1 * | 3/2002 | Igaki et al. | ................. 29/25.03 |
| 6,375,688 B1 * | 4/2002 | Akami et al. | .............. 29/25.03 |
| 6,519,137 B1 * | 2/2003 | Nitta et al. | ................... 361/525 |
| 7,388,741 B2 * | 6/2008 | Konuma et al. | ............. 361/528 |

FOREIGN PATENT DOCUMENTS

| | | | |
|---|---|---|---|
| EP | 0 385 523 A1 | 9/1990 |
| EP | 0 402 269 A1 | 12/1990 |
| EP | 1 437 750 A1 | 7/2004 |
| JP | 01-011209 B | 2/1989 |
| JP | 2-283722 A | 11/1990 |
| JP | 5-222129 A | 8/1993 |

(Continued)

OTHER PUBLICATIONS

Tian-An Chen, et al., Polyalkylthiophenes with the smallest bandgap and the highest intrinsic conductivity, Synthetic Metals, 60 (1993) 175-177.

(Continued)

*Primary Examiner*—Nguyen T Ha
(74) *Attorney, Agent, or Firm*—Knobbe Martens Olson & Bear LLP

(57) ABSTRACT

A conductive polymer having high conductivity and a solid electrolytic capacitor having low ESR are provided. A conductive polymer is synthesized using as a monomer a compound of a dimer to a decamer in which 3-alkyl five-membered heterocyclic rings are bonded at positions 2 and 5, being sterically controlled. Further, this conductive polymer is used as the solid electrolyte of a solid electrolytic capacitor.

16 Claims, 1 Drawing Sheet

FOREIGN PATENT DOCUMENTS

| | | |
|---|---|---|
| JP | P3241646 B2 | 10/2001 |
| JP | 2003-173933 A | 6/2003 |
| JP | 2007-501300 A | 1/2007 |
| WO | WO 2007/011945 A1 | 1/2007 |
| WO | WO 2007/077883 A1 | 7/2007 |

OTHER PUBLICATIONS

Richard D. Mccullough ,et al., the First Synthesis and New Properies of Regioregular, Head-To-Tail Coupled Polythiophenes, Department of Chemistry, Carnegie Mellon University, Pittsburgh, PA, Synthetic Metals 69 (1995) pp. 279-282.

* cited by examiner

CONDUCTIVE POLYMER AND SOLID ELECTROLYTIC CAPACITOR USING THE SAME

BACKGROUND OF THE INVENTION

1. Field of the Invention

The present invention relates to a conductive polymer and a solid electrolytic capacitor using the same.

2. Description of the Related Art

As electronic equipments become smaller, faster, and digitized, a low-impedance capacitor having small size, large capacity, and good high-frequency properties is also strongly demanded for the capacitor used.

Capacitors used in the high frequency region have been conventionally mainly multilayer ceramic capacitors, but it is difficult to address the needs of small size, large capacity, and low impedance with the multilayer ceramic capacitors.

As large-capacity capacitors, aluminum electrolytic capacitors, tantalum solid electrolytic capacitors, and the like have been conventionally used, but electrolytic solutions or electrolytes used for these, for example, manganese dioxide, have high resistance, so that it is difficult to achieve low impedance in the high frequency region.

In order to achieve low impedance in the high frequency region for these, a solid electrolytic capacitor using a conductive polymer is proposed. In such a capacitor, the resistance of the conductive polymer is lower than that of the electrolyte and manganese dioxide, so that the capacitor has low impedance.

In recent years, a demand for further lower impedance has been strong, and the higher conductivity of the conductive polymer used for the capacitor has been required. FIG. 1 is a schematic diagram of the internal structure of a solid electrolytic capacitor. In such a solid electrolytic capacitor, in many cases, an anode oxide film is formed on an anode body 1 having a porous shape to provide a dielectric layer 2, further, a solid electrolyte layer 3 is formed on the dielectric layer 2, and a graphite layer 4 and a silver layer 5 are formed in this order to provide a cathode, as shown in FIG. 1.

As the conductive polymer used as the solid electrolyte of such a solid electrolytic capacitor, polyaniline, polypyrrole, and poly(3,4-ethylenedioxythiophene) are generally known. In order to optimize the use of such existing compounds, the examination of additives and the like is promoted. For example, JP 3241636 B discloses a method for manufacturing a solid electrolytic capacitor in which a resin as a binder is added to a solution of the monomer of a conductive polymer in the step of forming a conductive polymer layer in the manufacture of a solid electrolytic capacitor.

On the other hand, attempts to achieve higher conductivity by controlling the skeleton, rather than by external factors such as additives, are also reported. For example, JP 01-011209 B discloses a technique for poly(3-alkylthiophene). According to this document, it is alleged that poly(3-alkylthiophene) can be easily manufactured by electrolytic polymerization of 3-alkylthiophene as a monomer in a solvent containing a supporting electrolyte. Further, it is alleged that the obtained poly(3-alkylthiophene) exhibits a conductivity of 60 S/cm to 95 S/cm.

JP 02-283722 A discloses a method for manufacturing a conductive polymer with 3-alkylthiophene as a monomer. According to this document, it is alleged that poly(3-alkylthiophene) having high conductivity can be manufactured by polymerizing 3-alkylthiophene as a monomer in a reaction medium containing ferric salt, alkyl halide, and water. For example, in JP 05-222129 A, it is alleged that when the polymer, which is obtained by removing low molecular weight poly(3-alkylthiophene), has a number average molecular weight of 15,000 or more containing 10% or less of polymer having a molecular weight of 10,000 or less, the conductivity is dramatically improved.

For example, T-A Chen and R. D. Rieke, Synthetic Metals, 60 (1993), 175-177, reports that poly(3-alkylthiophene) highly sterically controlled with 3-alkylthiophene as a monomer has a conductivity of 1350 S/cm, and the conductivity is improved with respect to 5 S/cm for a polymer in which the monomer is randomly bonded. JP 2007-501300 A discloses a technique for a method for manufacturing such highly sterically controlled poly(3-alkylthiophene).

However, with the attempts to improve the conductivity by adding additives to existing conductive polymers as in conventional techniques, a certain effect is obtained, but the effect of dramatically improving the conductivity is not obtained.

When the monocyclic compounds as described in JP 01-011209 B, JP 02-283722 A and JP 05-222129 A are used as monomers, the obtained polymers all have random configurations, so that a dramatic improvement in conductivity cannot be expected.

With the methods for forming an undoped conductive polymer by coupling reaction as described in T-A Chen and R. D. Rieke, Synthetic Metals, 60 (1993), 175-177, and JP 2007-501300 A, the control of the doping ratio is difficult. Generally, there is an appropriate value for the doping ratio, and if the doping ratio is too high or too low, the conductivity decreases. Therefore, when such methods are industrially used, equipment and analysis for precise control of chemical reaction are necessary, which are expensive.

Further, the generally used anode body for the solid electrolytic capacitor is a porous body, so that penetration into the pores is necessary. With such related art in which a polymer solution is obtained, application to the solid electrolytic capacitor is limited. In other words, the polymer solution cannot be used as a solid electrolyte in the pores and is limited to use such as for external coating.

However, for such a polymer obtained as the polymer solution, polyalkylthiophene is known as a soluble polymer, but by polyalkylthiophene being sterically controlled, its crystallinity increases, so that its solubility in a solvent decreases remarkably. In such a case, for use such as for external coating, a certain thickness is demanded for the polymer film after drying, but the solubility is too low, so that a thick film cannot be formed. Therefore, application to the solid electrolytic capacitor is difficult. The object of the present invention is to provide a conductive polymer having high conductivity that can be manufactured at low cost, and a solid electrolytic capacitor having low ESR using the same.

SUMMARY OF THE INVENTION

In order to solve the above problem, the conductive polymer of the present invention is represented by general formula (3) obtained by polymerizing as a monomer a compound represented by general formula (2), which has a basic skeleton from a 3-alkyl five-membered heterocyclic ring compound represented by general formula (1), in which two to ten molecules of the compounds represented by general formula (1) are bonded at positions 2 and 5 of five-membered heterocyclic rings with head-to-tail regulation of the alkyl groups;

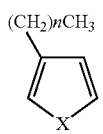
(1)

wherein X represents an atomic group of —NH— or an atom of S, O, or Se, and n represents an integer of 0 to 9;

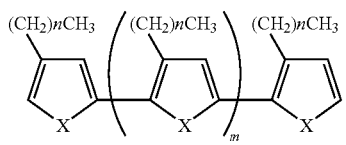
(2)

wherein X represents an atomic group of —NH— or an atom of S, O, or Se, n represents an integer of 0 to 9, and m represents an integer of 0 to 8,

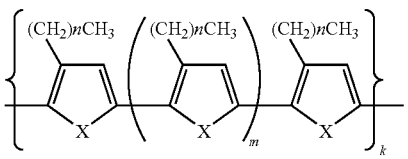
(3)

wherein X represents an atomic group of —NH— or an atom of S, O, or Se, n represents an integer of 0 to 9, m represents an integer of 0 to 8, and k represents a natural number.

In the conductive polymer of the present invention, the conductive 3 polymer represented by general formula (3) is obtained by a polymerization in a solution containing a dopant by chemical oxidative polymerization.

In the conductive polymer of the present invention, the conductive polymer represented by general formula (3) is obtained by a polymerization in a supporting electrolyte containing a dopant by electrolytic polymerization.

In the conductive polymer of the present invention, the dopant is at least one selected from the group consisting of compounds represented by general formulae (4) to (8):

ROSO$_3$H (4)

wherein R represents a hydrogen atom or an alkyl group having 1 to 15 carbon atoms,

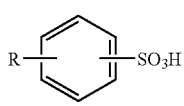
(5)

wherein R represents a hydrogen atom or an alkyl group having 1 to 15 carbon atoms,

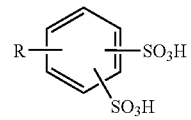
(6)

wherein R represents a hydrogen atom or an alkyl group having 1 to 15 carbon atoms,

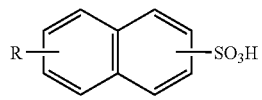
(7)

wherein R represents a hydrogen atom or an alkyl group having 1 to 15 carbon atoms,

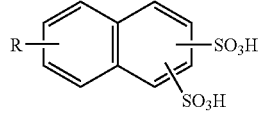
(8)

wherein R represents a hydrogen atom or an alkyl group having 1 to 15 carbon atoms.

The solid electrolytic capacitor of the present invention comprises: an anode body having an enlarged surface and including a valve action metal, a dielectric layer obtained by forming an oxide film on a surface of the anode body, a solid electrolyte layer, and a cathode layer; the solid electrolyte layer and the cathode layer being formed after the formation of the dielectric layer to provide a cathode, wherein the solid electrolyte comprises the conductive polymer of the above-mentioned present invention.

In the solid electrolytic capacitor of the present invention, the conductive polymer represented by general formula (3) is obtained on a surface of the dielectric layer by a polymerization in a solution containing a dopant by chemical oxidative polymerization.

In the solid electrolytic capacitor of the present invention, the dopant is at least one selected from the group consisting of compounds represented by above-mentioned general formulae (4) to (8).

In the solid electrolytic capacitor of the present invention, the valve action metal is at least one selected from the group consisting of tantalum, aluminum, and niobium.

The solid electrolytic capacitor of the present invention comprises: an anode body having an enlarged surface and including a valve action metal, a dielectric layer obtained by forming an oxide film on a surface of the anode body, a first solid electrolyte layer, a second solid electrolyte layer, and a cathode layer; the first solid electrolyte layer, the second solid electrolyte layer, and the cathode layer being formed after the formation of the dielectric layer; wherein one of the first solid electrolyte layer and the second solid electrolyte layer comprises manganese dioxide or a conductive polymer such as polypyrrole, polythiophene, and polyphenylenevinylene and derivatives thereof; and wherein the other comprises the conductive polymer of the above-mentioned present invention.

In the solid electrolytic capacitor of the present invention, the second solid electrolyte layer, in which the conductive polymer represented by general formula (3) is obtained by a polymerization in a solution containing a dopant by chemical oxidative polymerization, is formed on the first solid electrolyte layer.

In the solid electrolytic capacitor of the present invention, the second solid electrolyte layer, in which the conductive polymer represented by general formula (3) is obtained by a polymerization in a supporting electrolyte containing a dopant by electrolytic polymerization, is formed on the first solid electrolyte layer.

In the solid electrolytic capacitor of the present invention, the second solid electrolyte layer is formed by applying a solution or dispersion of the conductive polymer represented by general formula (3).

In the solid electrolytic capacitor of the present invention, the dopant is at least one selected from the group consisting of compounds represented by above-mentioned general formulae (4) to (8).

In the solid electrolytic capacitor of the present invention, the valve action metal is at least one selected from the group consisting of tantalum, aluminum, and niobium.

According to the present invention, by the monomer having stereoregularity, the polymerization product can have stereoregularity at a ratio according to the structure of the monomer even by polymerization methods in which a polymer having random stereoregularity is produced, such as chemical oxidative polymerization and electrolytic polymerization. Thus, due to the effect of stereoregularity control, the crystallinity of the polymer chain is improved, and the conductivity is dramatically improved, compared with random polymerization products.

Conventionally, polymerization by coupling reaction or the like has been necessary for stereoregularity control, but it is possible to perform polymerization by an easy method, so that lower cost is achieved. A polymerization product synthesized by coupling reaction contains no dopant, so that the step of doping the polymer chain is necessary to obtain high conductivity, but in the conductive polymer of the present invention, a required amount of a dopant is taken into the polymer chain during chemical oxidative polymerization or electrolytic polymerization, so that the step of doping is unnecessary. An appropriate doping amount is obtained, so that a conductive polymer having high conductivity is efficiently produced, compared with methods for later performing the process of doping for the polymer chain.

In the solid electrolytic capacitor of the present invention, the conductive polymer used as the solid electrolyte has high conductivity for the above-mentioned reason, so that it is possible to provide a solid electrolytic capacitor having low ESR.

DETAILED DESCRIPTION OF THE PREFERRED EMBODIMENTS

Figure 1:
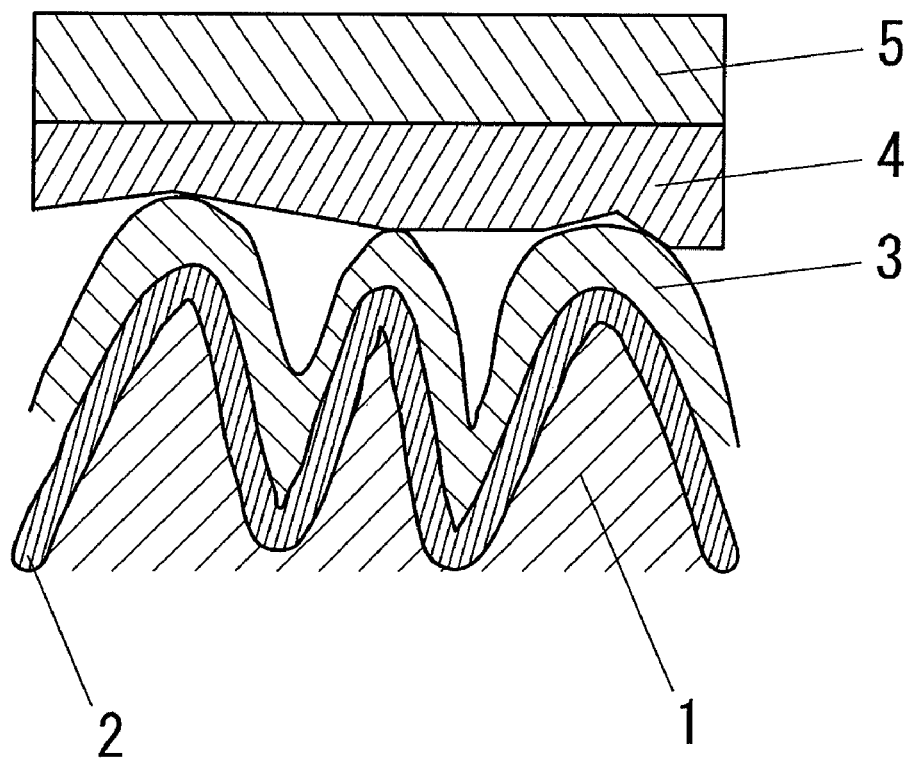
FIG. 1 is a schematic diagram of the internal structure of a solid electrolytic capacitor.

Specific examples for carrying out the present invention are shown below. Examples using thiophene as a five-membered heterocyclic ring compound are described, but the present invention is not limited to this.

Methods for obtaining the monomer represented by general formula (2) for synthesizing the conductive polymer represented by general formula (3) of the present invention include: (a) a method for obtaining the monomer through the step of performing polymerization with the action of an oxidant under conditions in which an excessive amount of 3-alkylthiophene as represented by general formula (1) is present, the step of reducing the obtained product, and the step of extracting a low molecular weight compound for each molecular weight and steric structure by liquid chromatography or the like; (b) a method for obtaining the monomer through the step of coupling reaction by Grignard reaction or the like in the presence of 3-alkyl-2,5-dihalogenated thiophene, 3-alkyl-2-halogenated thiophene, and 3-alkyl-5-halogenated thiophene, the step of purifying the product, and the step of extracting a low molecular weight compound for each molecular weight and steric structure by liquid chromatography or the like; (c) a method for obtaining the monomer by synthesis by the step of the coupling reaction of 3-alkyl-2-halogenated thiophene and 3-alkyl-5-halogenated thiophene followed by the steps of halogenation and sequential coupling reaction; and the like; but the methods for obtaining the monomer are not limited to these.

In this case, in general formula (2), m is desirably 0 to 8. If m is 9 or more, due to a decrease in the solubility of the monomer, due to a decrease in doping ratio for the five-membered heterocyclic ring during oxidative polymerization, due to a decrease in solubility caused by the too high crystallinity of the polymerization product, and the like, the conductivity of the obtained conductive polymer decreases, therefore, m being 9 or more is not preferred. In general formula (2), n is preferably 0 to 9. If n is 10 or more, polymerization is inhibited by the steric hindrance of the long alkyl chain, so that only a low molecular weight polymer is obtained. Also in this case, similarly, the conductivity decreases, therefore, this case is not preferred.

Methods for obtaining the conductive polymer represented by general formula (3), using the monomer represented by general formula (2) obtained by the methods as described above include a chemical oxidative polymerization method and an electrolytic polymerization method.

A method for polymerizing these monomers represented by general formula (2) by the chemical oxidative polymerization method will be described. First, as the reaction solvent, a solvent, in which the monomer and the oxidant used can be dissolved, is preferred, but the reaction solvent is not limited to this. It is also possible to allow reaction in a heterogeneous system using solvents in which the monomer and the oxidant are respectively dissolved. These solvents include, for example, water, sulfuric acid, methanol, ethanol, propanol, N,N-dimethylformamide, N,N-dimethylacetamide, dimethylsulfoxide, chloroform, dichloromethane, carbon tetrachloride, benzene, toluene, xylene, tetrahydrofuran, N-methyl-2-pyrrolidone, and propylene carbonate.

The oxidants include ferric chloride, iron (III) tri(p-toluenesulfonate), sodium persulfate, potassium persulfate, ammonium persulfate, hydrogen peroxide, and potassium permanganate.

A dopant is mixed in the oxidant solution for use. The dopants include compounds, for example, sulfuric acid, alkylsulfuric acid such as heptylsulfuric acid and octylsulfuric acid, benzenesulfonic acid, alkylbenzenesulfuric acid such as toluenesulfonic acid and ethylbenzenesulfonic acid, alkylbenzenedisulfonic acid such as toluenedisulfonic acid, naphthalenesulfonic acid, alkylnaphthalenesulfonic acid such as methylnaphthalenesulfonic acid, naphthalenedisulfonic acid, and alkylnaphthalenedisulfonic acid such as methylnaphthalenedisulfonic acid.

Using the solvent, the oxidant, and the dopant, the mixed solution of the oxidant and the dopant is dropped into the monomer solution for reaction; adjusting the concentration of the monomer to from 1 mmol/L to 1000 mmol/L, preferably from 10 mmol/L to 200 mmol/L; adjusting the concentration of the oxidant to from 1 mmol/L to 1000 mmol/L, preferably from 10 mmol/L to 200 mmol/L; and adjusting the concentration of the dopant to from 5 mmol/L to 5000 mmol/L, preferably from 50 mmol/L to 1000 mmol/L. If the concentration is too high, side reaction occurs easily, producing a conductive polymer having low conductivity, therefore, too high concentration is not preferred. On the contrary, if the concentration is too low, the reaction does not proceed easily, therefore, too low concentration is not preferred. The reaction temperature is preferably in the range of −40° C. to 110° C., preferably −20° C. to 40° C., and further preferably −20° C. to 10° C., and polymerization is performed in the temperature range of from a temperature at which the solvent used does not freeze to the boiling point. If the temperature is too high, side reaction occurs easily, producing a conductive polymer having low conductivity, therefore, too high temperature is not preferred. For the reaction to proceed smoothly, the reaction is preferably performed in a range, in which the solvent does not freeze and the viscosity does not increase, and at a temperature as low as possible. The reaction time is preferably in the range of 0.1 hour to 72 hours, preferably 0.1 hour to 10 hours.

Next, a method for performing polymerization by the electrolytic polymerization method will be described. First, as the polymerization solvent, a solvent, in which the monomer and a dopant are each dissolved, is preferred. These solvents include, for example, water, sulfuric acid, methanol, ethanol, propanol, N,N-dimethylformamide, N,N-dimethylacetamide, dimethylsulfoxide, tetrahydrofuran, N-methyl-2-pyrrolidone, and propylene carbonate.

A dopant is dissolved in the polymerization solution for use. The dopants include compounds, for example, sulfuric acid, alkylsulfuric acid such as heptylsulfuric acid and octylsulfuric acid, benzenesulfonic acid, alkylbenzenesulfonic acid such as toluenesulfonic acid and ethylbenzenesulfonic acid, alkylbenzenedisulfonic acid such as toluenedisulfonic acid, naphthalenesulfonic acid, alkylnaphthalenesulfonic acid such as methylnaphthalenesulfonic acid, naphthalenedisulfonic acid, and alkylnaphthalenedisulfonic acid such as methylnaphthalenedisulfonic acid.

For electrolytic polymerization, there are a method for polymerizing the mixed solution of the monomer and the dopant by a potential sweep method or a constant voltage method using a potentiostat, and a method for polymerizing the mixed solution by a constant current method using a galvanostat. In this case, the concentration of the monomer is appropriately set to 1 mmol/L to 1000 mmol/L, preferably 10 mmol/L to 200 mmol/L, and the concentration of the electrolyte is appropriately set to 1 mmol/L to 2000 mmol/L, preferably 50 mmol/L to 500 mmol/L.

When polymerization is performed by the potential sweep method, preferably, the potential is swept in the range of −500 mV to 2500 mV, preferably 0 mV to 2000 mV, with respect to the standard hydrogen electrode. If the sweep potential is too high, decomposition due to peroxidation occurs, therefore, too high sweep potential is not preferred. In this case, the reaction time is appropriately in the range of 0.1 hour to 72 hours, preferably 0.1 hour to 10 hours. If the polymerization time is too long, a polymerization product is attached like a powder, rather than like a film, therefore, too long polymerization time is not preferred. The product in the form of a film has higher conductivity.

When polymerization is performed by the constant voltage method, polymerization can be performed optionally setting the potential at which the monomer is oxidized, in the range of 0 mV to 2500 mV, preferably 500 mV to 2000 mV, with respect to the standard hydrogen electrode. If the set potential is too high, decomposition due to peroxidation occurs, therefore, too high set potential is not preferred. In this case, the reaction time is appropriately in the range of 0.1 hour to 72 hours, preferably 0.1 hour to 10 hours. If the polymerization time is too long, a polymerization product is attached like a powder, rather than like a film, therefore, too long polymerization time is not preferred.

When polymerization is performed by the constant current method, polymerization is appropriately performed in the range of 0.1 mA/cm$^2$ to 50 mA/cm$^2$, preferably 0.1 mA/cm$^2$ to 10 mA/cm$^2$, with respect to the area of the working electrode used. In this case, the reaction time is appropriately in the range of 0.1 hour to 72 hours, preferably 0.1 hour to 10 hours. If the polymerization time is too long, a polymerization product is attached like a powder, rather than like a film, therefore, too long polymerization time is not preferred.

Next, a method for manufacturing the solid electrolytic capacitor of the present invention will be described. FIG. 1 is a schematic diagram of the internal structure of a solid electrolytic capacitor. The configuration of the solid electrolytic capacitor of the present invention is similar to that of a conventional one except that the conductive polymer of the present invention is used. More concretely, an anode oxide film is formed on an anode body 1 to provide a dielectric layer 2, and a conductive polymer layer that is a solid electrolyte layer 3 is formed on the dielectric layer 2. Further, a graphite layer 4 and a silver layer 5 are formed on the solid electrolyte layer 3 to provide a cathode.

In this case, the anode body 1 may be selected from the group consisting of aluminum, tantalum, niobium, and the like.

EXAMPLES

The present invention will be described below in detail by way of examples.

Conductive polymers were synthesized from compounds represented by general formula (2) as monomers, with X, n, and m changed. The monomer was synthesized by allowing the coupling of a mixture of 2-halogenated-3-alkyl compound, 5-halogenated-3-alkyl compound, and 2,5-dihalogenated-3-alkyl compound, using Grignard reaction, and by isolating the obtained products for each molecular weight.

In Examples 1 to 15, polymerization was performed by the chemical oxidative polymerization method, selecting acetonitrile as a solvent, ferric chloride as an oxidant, and p-toluenesulfonic acid, toluenedisulfonic acid, naphthalenesulfonic acid, or naphthalenedisulfonic acid as a dopant. The concentration of the monomer was set to be 50 mmol/L, and the concentration of the oxidant and the dopant in the final mixed solution was set to be 100 mmol/L and 300 mmol/L respectively. The reaction time was 1 hour, and the reaction temperature was 25° C. The obtained solution of the reaction product was dropped and dried on a glass substrate to provide a film, and the conductivity was measured by a four-terminal method. A list of the results is shown in Table 1.

In Comparative Examples 1 and 2, polymerization was performed under conditions similar to those of Examples 1 to 15, selecting 3-hexylthiophene as a monomer, and p-toluenesulfonic acid or naphthalenesulfonic acid as a dopant, and the conductivity was measured. The results are shown in Table 1.

TABLE 1

| | X | n | m | Dopant | Conductivity (S/cm) |
|---|---|---|---|---|---|
| Example 1 | NH | 6 | 0 | p-toluenesulfonic acid | 67 |
| Example 2 | NH | 6 | 0 | naphthalenesulfonic acid | 60 |
| Example 3 | NH | 6 | 1 | p-toluenesulfonic acid | 98 |
| Example 4 | S | 4 | 1 | p-toluenesulfonic acid | 91 |
| Example 5 | S | 6 | 0 | p-toluenesulfonic acid | 85 |
| Example 6 | S | 6 | 0 | naphthalenesulfonic acid | 74 |
| Example 7 | S | 6 | 1 | p-toluenesulfonic acid | 122 |
| Example 8 | S | 6 | 1 | toluenedisulfonic acid | 81 |
| Example 9 | S | 6 | 1 | naphthalenesulfonic acid | 103 |
| Example 10 | S | 6 | 1 | naphthalenedisulfonic acid | 76 |
| Example 11 | S | 6 | 3 | p-toluenesulfonic acid | 110 |
| Example 12 | S | 6 | 5 | p-toluenesulfonic acid | 66 |
| Example 13 | S | 6 | 8 | p-toluenesulfonic acid | 62 |
| Example 14 | S | 6 | 9 | p-toluenesulfonic acid | 54 |
| Example 15 | S | 6 | 10 | p-toluenesulfonic acid | 42 |
| Comparative Example 1 | — | — | — | p-toluenesulfonic acid | 56 |
| Comparative Example 2 | — | — | — | naphthalenesulfonic acid | 47 |

In Examples 16 to 27, polymerization was performed by the electrolytic polymerization method, selecting acetonitrile as a solvent, and p-toluenesulfonic acid or naphthalenesulfonic acid as a dopant. The concentration of the monomer was set to 30 mmol/L, and the concentration of the dopant also serving as a supporting electrolyte was set to 500 mmol/L. As the method of electrolytic polymerization, the potential sweep method was selected, and sweep was repeated at a speed of 50 mV/s in the range of 200 mV to 1800 mV with respect to the standard hydrogen electrode. The reaction time was 1 hour, and the reaction temperature was 25° C. For each of the working electrode and the counter electrode, a platinum plate was used. A conductive polymer film produced on the working electrode was peeled off, and the conductivity was measured by the four-terminal method. A list of the results is shown in Table 2.

In Comparative Examples 3 and 4, polymerization was performed as in Examples 16 to 27, selecting 3-hexylthiophene as a monomer, and p-toluenesulfonic acid or naphthalenesulfonic acid as a dopant, and the conductivity was measured. The results are shown in Table 2.

TABLE 2

| | X | n | m | Dopant | Conductivity (S/cm) |
|---|---|---|---|---|---|
| Example 16 | NH | 6 | 0 | p-toluenesulfonic acid | 88 |
| Example 17 | NH | 6 | 0 | naphthalenesulfonic acid | 81 |
| Example 18 | NH | 6 | 1 | p-toluenesulfonic acid | 103 |
| Example 19 | S | 4 | 1 | p-toluenesulfonic acid | 95 |
| Example 20 | S | 6 | 0 | p-toluenesulfonic acid | 101 |
| Example 21 | S | 6 | 0 | naphthalenesulfonic acid | 90 |
| Example 22 | S | 6 | 1 | p-toluenesulfonic acid | 124 |
| Example 23 | S | 6 | 3 | p-toluenesulfonic acid | 131 |
| Example 24 | S | 6 | 5 | p-toluenesulfonic acid | 88 |
| Example 25 | S | 6 | 8 | p-toluenesulfonic acid | 82 |
| Example 26 | S | 6 | 9 | p-toluenesulfonic acid | 62 |
| Example 27 | S | 6 | 10 | p-toluenesulfonic acid | 54 |
| Comparative Example 3 | — | — | — | p-toluenesulfonic acid | 78 |
| Comparative Example 4 | — | — | — | naphthalenesulfonic acid | 65 |

In Examples 28 to 30, a solid electrolytic capacitor was fabricated using as an anode an aluminum foil whose surface was enlarged by etching. The cathode portion had a size of 1 cm×1 cm, and the anode portion had a size of 1 cm×0.5 cm. They were separated by an insulating resist material.

An oxide film was formed in the cathode portion by anode oxidation to provide a dielectric layer. A conductive polymer layer was formed on this dielectric layer by chemical oxidative polymerization. Polymerization was performed by the chemical oxidative polymerization method, selecting acetonitrile as a solvent, ferric chloride as an oxidant, and p-toluenesulfonic acid, naphthalenesulfonic acid, or a mixture thereof in a mol ratio of 1:1 as a dopant. The concentration of the monomer was set to be 50 mmol/L, and the concentration of the oxidant and the dopant in the final mixed solution was set to be 100 mmol/L and 300 mmol/L respectively. The reaction time was 1 hour, and the reaction temperature was 25° C. A graphite layer and a silver layer are formed in this order on the conductive polymer layer to provide a cathode. The ESR of the manufactured solid electrolytic capacitor was measured by an LCR meter, and the value was at 100 kHz. A list of results is shown in Table 3.

In Comparative Example 5, a solid electrolytic capacitor was manufactured as in Example 28 except that 3-hexylthiophene was selected as a monomer.

TABLE 3

| | X | n | m | Dopant | ESR (mΩ) |
|---|---|---|---|---|---|
| Example 28 | S | 6 | 1 | p-toluenesulfonic acid | 2.6 |
| Example 29 | S | 6 | 1 | naphthalenesulfonic acid | 3.0 |
| Example 30 | S | 6 | 1 | p-toluenesulfonic acid/ naphthalenesulfonic acid | 2.7 |
| Comparative Example 5 | — | — | — | p-toluenesulfonic acid | 4.2 |

In Examples 31 and 32, a solid electrolytic capacitor using as an anode an aluminum foil, whose surface was enlarged by etching, and having a first solid electrolyte layer and a second solid electrolyte layer was fabricated. The cathode portion had a size of 1 cm×1 cm, and the anode portion had a size of 1 cm×0.5 cm. They were separated by an insulating resist material.

An oxide film was formed in the cathode portion by anode oxidation to provide a dielectric layer. Polypyrrole was formed on this dielectric layer by chemical oxidative polymerization as the first solid electrolyte layer. The second solid electrolyte layer was formed on the first solid electrolyte layer by chemical polymerization or electrolytic polymerization, selecting p-toluenesulfonic acid as a dopant. The formation of the second solid electrolyte layer by chemical polymerization was performed as in Example 28. For the formation of the second solid electrolyte layer by electrolytic polymerization, polymerization was performed selecting acetonitrile as a solvent, and p-toluenesulfonic acid as a dopant. The concentration of the monomer was set to 30 mmol/L, and the concentration of the dopant also serving as a supporting electrolyte was set to 500 mmol/L. As the method of electrolytic polymerization, the potential sweep method was selected, and sweep was repeated at a speed of 50 mV/s in the range of 200 mV to 1800 mV with respect to the standard hydrogen electrode. The reaction time was 1 hour, and the reaction temperature was 25° C. The ESR of the manufactured solid electrolytic capacitor was measured by the LCR meter, and the value at 100 kHz was shown. A list of results is shown in Table 4.

In Comparative Examples 6 and 7, a solid electrolytic capacitor was manufactured by forming a second solid electrolyte layer using chemical polymerization or electrolytic polymerization as in Examples 31 and 32, selecting 3-hexylthiophene as the monomer of a conductive polymer for a second solid electrolyte layer. A list of results is shown in Table 4.

TABLE 4

| | X | n | m | Method for polymerizing second conductive polymer | ESR (mΩ) |
|---|---|---|---|---|---|
| Example 31 | S | 6 | 1 | chemical oxidative polymerization | 2.2 |
| Example 32 | S | 6 | 1 | electrolytic polymerization | 1.9 |
| Comparative Example 6 | — | — | — | chemical oxidative polymerization | 3.2 |
| Comparative Example 7 | — | — | — | electrolytic polymerization | 2.9 |

In Example 33, a conductive polymer solution having 5% by weight of solid components was manufactured by stirring in xylene a conductive polymer manufactured by the method described in Example 7 for 24 hours. This solution was dropped and dried in a cathode portion, in which polypyrrole was formed on a dielectric layer by chemical oxidative polymerization as a first solid electrolyte layer as in Examples 31 and 32, to provide a second solid electrolyte layer. The ESR was measured by the LCR meter, and the value was at 100 kHz. The result is shown in Table 5.

TABLE 5

| | X | n | m | Method for forming second conductive polymer | ESR (mΩ) |
|---|---|---|---|---|---|
| Example 33 | S | 6 | 1 | dropping and drying of water dispersion | 2.4 |

The conductive polymer of the present invention as described above, as shown in Examples 1 to 27, has higher conductivity, compared with the case where polymerization is similarly performed using as a monomer 3-alkylthiophene which is a monocyclic compound. This results from the fact that in the conductive polymer of the present invention, by polymerizing a dimer to a decamer of 3-alkylthiophene having stereoregularity (m in general formula (2) is 0 to 8) as a monomer, stereoregularity according to the monomer is introduced into the obtained polymerization product. Thus, the molecule crystallinity increases, and the conductivity is improved.

In this case, as shown in Examples 14, 15, 26, and 27, when m in general formula (2) is 9 or more, the conductivity decreases. This results from a decrease in the solubility of the monomer, a decrease in doping ratio for the five-membered heterocyclic ring during oxidative polymerization, a decrease in solubility caused by the too high crystallinity of the polymerization product, and the like.

The present invention can provide a solid electrolytic capacitor having low ESR by using the conductive polymer of the present invention as the solid electrolyte layer, as described in Examples 28 to 30. Further, it is possible to provide a solid electrolytic capacitor having low ESR by forming the conductive polymer layer of the present invention on the first solid electrolyte layer to provide the second solid electrolyte layer, as described in Examples 31 to 33. These both result from the fact that the resistance of the solid electrolyte layer is reduced by using the conductive polymer of the present invention.

As described above, in the conductive polymer of the present invention, a suitable doping amount is obtained during chemical oxidative polymerization or electrolytic polymerization, so that a suitable doping ratio is easily obtained compared with conventional methods for doping a polymer polymerized by coupling reaction or the like. Therefore, it is possible to manufacture a conductive polymer having high conductivity by an easy method.

Next, by using a compound of a dimer to a decamer (m in general formula (2) is 0 to 8) as a monomer, impregnation into the pores of the porous anode body used for the solid electrolytic capacitor is possible, and by polymerizing in the pores, a conductive polymer can be formed in the pores. With conventional methods for doping a polymer solution to provide a conductive polymer, impregnation into the pores is impossible, so that the formation of a conductive polymer in the pores is impossible.

Lastly, stereoregularity of the conductive polymer of the present invention is moderately controlled, so that it is possible to prevent a decrease in solubility caused by an increase in crystallinity when a conductive polymer is conventionally highly sterically controlled, therefore, it is possible to manufacture a high concentration conductive polymer solution. Thus, it is possible to use the conductive polymer of the present invention also for applications in which a conductive polymer is conventionally used such as for forming a thick film outside a solid electrolytic capacitor.

What is claimed is:

1. A conductive polymer represented by general formula (3) obtained by polymerizing as a monomer a compound represented by general formula (2), which has a basic skeleton from a 3-alkyl five-membered heterocyclic ring compound represented by general formula (1), in which two to ten molecules of the compounds represented by general formula (1) are bonded at positions 2 and 5 of five-membered heterocyclic rings with head-to-tail regulation of the alkyl groups;

(1)

wherein X represents an atomic group of —NH— or an atom of S, O, or Se, and n represents an integer of 0 to 9;

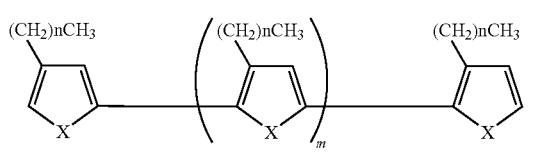

(2)

wherein X represents an atomic group of —NH— or an atom of S, O, or Se, n represents an integer of 0 to 9, and m represents an integer of 0 to 8,

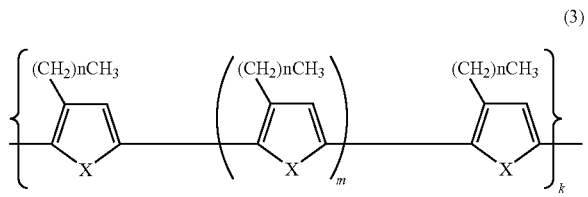
(3)

wherein X represents an atomic group of —NH— or an atom of S, O, or Se, n represents an integer of 0 to 9, m represents an integer of 0 to 8, and k represents a natural number.

2. The conductive polymer according to claim 1, wherein the conductive polymer represented by general formula (3) is obtained by a polymerization in a solution containing a dopant by chemical oxidative polymerization.

3. The conductive polymer according to claim 2, wherein the dopant is at least one selected from the group consisting of compounds represented by general formulae (4) to (8):

ROSO$_3$H     (4)

wherein R represents a hydrogen atom or an alkyl group having 1 to 15 carbon atoms,

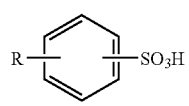
(5)

wherein R represents a hydrogen atom or an alkyl group having 1 to 15 carbon atoms,

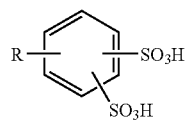
(6)

wherein R represents a hydrogen atom or an alkyl group having 1 to 15 carbon atoms,

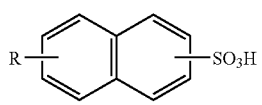
(7)

wherein R represents a hydrogen atom or an alkyl group having 1 to 15 carbon atoms,

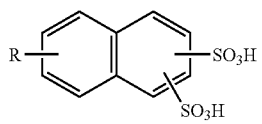
(8)

wherein R represents a hydrogen atom or an alkyl group having 1 to 15 carbon atoms.

4. The conductive polymer according to claim 1, wherein the conductive polymer represented by general formula (3) is obtained by a polymerization in a supporting electrolyte containing a dopant by electrolytic polymerization.

5. The conductive polymer according to claim 4, wherein the dopant is at least one selected from the group consisting of compounds represented by general formulae (4) to (8):

ROSO$_3$H     (4)

wherein R represents a hydrogen atom or an alkyl group having 1 to 15 carbon atoms,

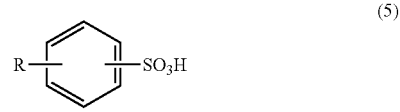
(5)

wherein R represents a hydrogen atom or an alkyl group having 1 to 15 carbon atoms,

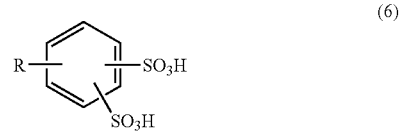
(6)

wherein R represents a hydrogen atom or an alkyl group having 1 to 15 carbon atoms,

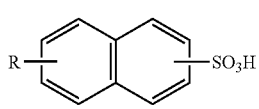
(7)

wherein R represents a hydrogen atom or an alkyl group having 1 to 15 carbon atoms,

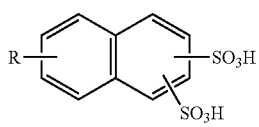
(8)

wherein R represents a hydrogen atom or an alkyl group having 1 to 15 carbon atoms.

6. A solid electrolytic capacitor comprising: an anode body having an enlarged surface and including a valve action metal, a dielectric layer obtained by forming an oxide film on a surface of the anode body, a solid electrolyte layer, and a cathode layer; the solid electrolyte layer and the cathode layer being formed after the formation of the dielectric layer to provide a cathode; wherein the solid electrolyte comprises a conductive polymer represented by general formula (3) obtained by polymerizing as a monomer a compound represented by general formula (2), which has a basic skeleton from a 3-alkyl five-membered heterocyclic ring compound represented by general formula (1), in which two to ten molecules of the compounds represented by general formula (1) are bonded at positions 2 and 5 of five-membered heterocyclic rings with head-to-tail regulation of the alkyl groups;

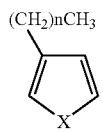

(1)

wherein X represents an atomic group of —NH— or an atom of S, O, or Se, and n represents an integer of 0 to 9;

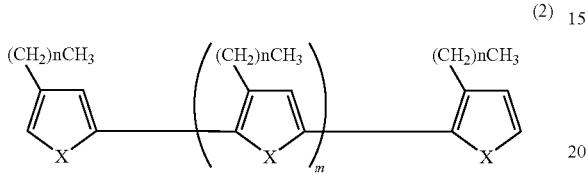

(2)

wherein X represents an atomic group of —NH— or an atom of S, O, or Se, n represents an integer of 0 to 9, and m represents an integer of 0 to 8,

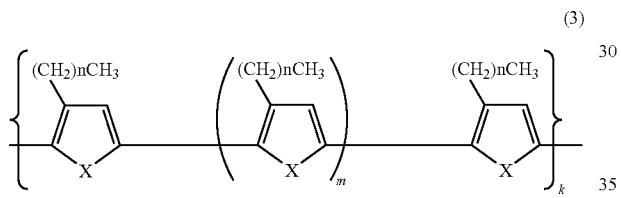

(3)

wherein X represents an atomic group of —NH— or an atom of S, O, or Se, n represents an integer of 0 to 9, m represents an integer of 0 to 8, and k represents a natural number.

7. The solid electrolytic capacitor according to claim 6, wherein the conductive polymer represented by general formula (3) is obtained on a surface of the dielectric layer by a polymerization in a solution containing a dopant by chemical oxidative polymerization.

8. The solid electrolytic capacitor according to claim 7, wherein the dopant is at least one selected from the group consisting of compounds represented by general formulae (4) to (8):

ROSO$_3$H        (4)

wherein R represents a hydrogen atom or an alkyl group having 1 to 15 carbon atoms,

(5)

wherein R represents a hydrogen atom or an alkyl group having 1 to 15 carbon atoms,

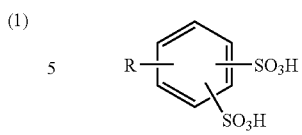

(6)

wherein R represents a hydrogen atom or an alkyl group having 1 to 15 carbon atoms,

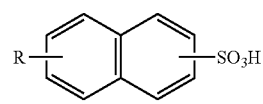

(7)

wherein R represents a hydrogen atom or an alkyl group having 1 to 15 carbon atoms,

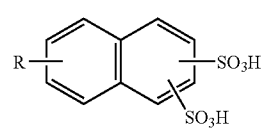

(8)

wherein R represents a hydrogen atom or an alkyl group having 1 to 15 carbon atoms.

9. The solid electrolytic capacitor according to claim 6, wherein the valve action metal is at least one selected from the group consisting of tantalum, aluminum, and niobium.

10. A solid electrolytic capacitor comprising: an anode body having an enlarged surface and including a valve action metal, a dielectric layer obtained by forming an oxide film on a surface of the anode body, a first solid electrolyte layer, a second solid electrolyte layer, and a cathode layer; the first solid electrolyte layer, the second solid electrolyte layer, and the cathode layer being formed after the formation of the dielectric layer; wherein one of the first solid electrolyte layer and the second solid electrolyte layer comprises manganese dioxide or a conductive polymer such as polypyrrole, polythiophene, and polyphenylenevinylene and derivatives thereof; and wherein the other comprises a conductive polymer represented by general formula (3) obtained by polymerizing as a monomer a compound represented by general formula (2), which has a basic skeleton from a 3-alkyl five-membered heterocyclic ring compound represented by general formula (1), in which two to ten molecules of the compounds represented by general formula (1) are bonded at positions 2 and 5 of five-membered heterocyclic rings with head-to-tail regulation of the alkyl groups;

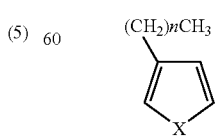

(1)

wherein X represents an atomic group of —NH— or an atom of S, O, or Se, and n represents an integer of 0 to 9;

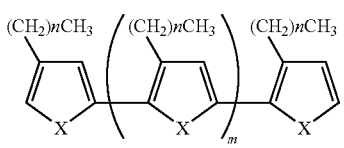

(2)

wherein X represents an atomic group of —NH— or an atom of S, O, or Se, n represents an integer of 0 to 9, and m represents an integer of 0 to 8,

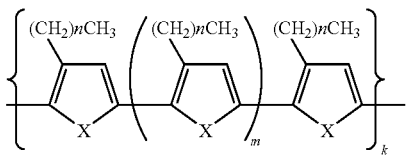

(3)

wherein X represents an atomic group of —NH— or an atom of S, O, or Se, n represents an integer of 0 to 9, m represents an integer of 6 to 8, and k represents a natural number.

11. The solid electrolytic capacitor according to claim 10, wherein the second solid electrolyte layer, in which the conductive polymer represented by general formula (3) is obtained by a polymerization in a solution containing a dopant by chemical oxidative polymerization, is formed on the first solid electrolyte layer.

12. The solid electrolytic capacitor according to claim 11, wherein the dopant is at least one selected from the group consisting of compounds represented by general formulae (4) to (8):

ROSO$_3$H    (4)

wherein R represents a hydrogen atom or an alkyl group having 1 to 15 carbon atoms,

(5)

wherein R represents a hydrogen atom or an alkyl group having 1 to 15 carbon atoms,

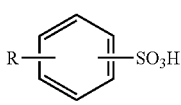

(6)

wherein R represents a hydrogen atom or an alkyl group having 1 to 15 carbon atoms,

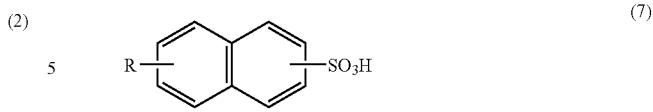

(7)

wherein R represents a hydrogen atom or an alkyl group having 1 to 15 carbon atoms,

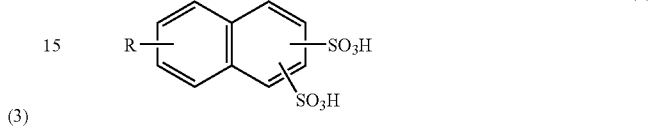

(8)

wherein R represents a hydrogen atom or an alkyl group having 1 to 15 carbon atoms.

13. The solid electrolytic capacitor according to claim 10, wherein the second solid electrolyte layer, in which the conductive polymer represented by general formula (3) is obtained by a polymerization in a supporting electrolyte containing a dopant by electrolytic polymerization, is formed on the first solid electrolyte layer.

14. The solid electrolytic capacitor according to claim 13, wherein the dopant is at least one selected from the group consisting of compounds represented by general formulae (4) to (8):

ROSO$_3$H    (4)

wherein R represents a hydrogen atom or an alkyl group having 1 to 15 carbon atoms,

(5)

wherein R represents a hydrogen atom or an alkyl group having 1 to 15 carbon atoms,

(6)

wherein R represents a hydrogen atom or an alkyl group having 1 to 15 carbon atoms,

(7)

wherein R represents a hydrogen atom or an alkyl group having 1 to 15 carbon atoms,

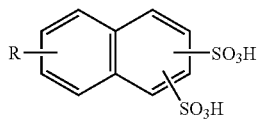 (8)

wherein R represents a hydrogen atom or an alkyl group having 1 to 15 carbon atoms.

15. The solid electrolytic capacitor according to claim 10, wherein the second solid electrolyte layer is formed by applying a solution or dispersion of the conductive polymer represented by general formula (3).

16. The solid electrolytic capacitor according to claim 10, wherein the valve action metal is at least one selected from the group consisting of tantalum, aluminum, and niobium.

* * * * *

UNITED STATES PATENT AND TRADEMARK OFFICE
CERTIFICATE OF CORRECTION

PATENT NO. : 7,602,602 B2
APPLICATION NO. : 12/360238
DATED : October 13, 2009
INVENTOR(S) : Naoki Takahashi et al.

It is certified that error appears in the above-identified patent and that said Letters Patent is hereby corrected as shown below:

On the title page, page 2, Column 2/Item [56]; Under Other Publications, delete "Properies" and insert --Properties--.

Column 3, line 42; After "conductive" delete "3".

Column 6, line 58; delete "alkylbenzenesulfuric" and insert --alkylbenzenesulfonic--.

Column 17, line 29; In Claim 10 delete "6" and insert --0--.

Signed and Sealed this

Twenty-third Day of March, 2010

David J. Kappos
*Director of the United States Patent and Trademark Office*